Patented Jan. 1, 1929.

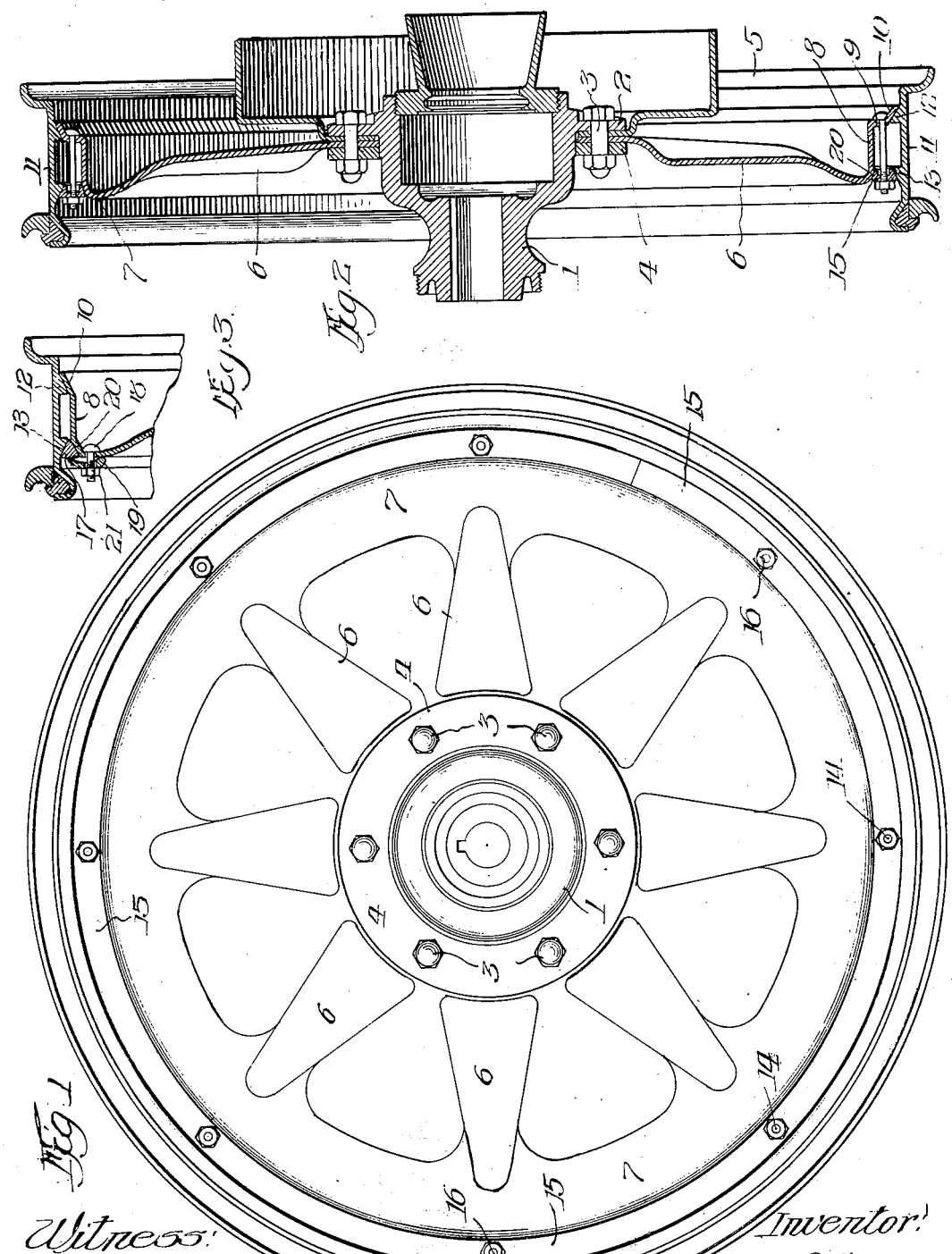

1,697,796

UNITED STATES PATENT OFFICE.

JOSEPH G. SWAIN, OF AKRON, OHIO, ASSIGNOR TO THE FIRESTONE STEEL PRODUCTS COMPANY, OF AKRON, OHIO, A CORPORATION OF OHIO.

METALLIC WHEEL AND DEMOUNTABLE RIM.

Application filed January 7, 1919. Serial No. 270,041.

It is the purpose of this invention to perfect a form of metallic wheel in combination with a demountable rim and securing devices, which will be strong and durable, easily operable, neat in appearance, of light weight and well balanced.

The wheel body may be made in any preferred manner, being preferably of pressed steel, although it may be of cast metal if desired, and is preferably of design such as shown in my prior applications, Serial Nos. 211,483 and 222,617, filed January 12, 1918, and March 15, 1918, respectively.

The construction of the body portion of the wheel is not essential to the invention embodied herein and I am not limited to the form shown, nor am I limited to such details of the rim or mounting devices as are particularly set forth, as these may be varied without departing from the invention.

In the drawings are shown certain forms of the device embodying the invention, it being understood that further modifications are possible.

Fig. 1 is a side elevation of a wheel carrying a demountable rim and my securing devices.

Fig. 2 is a cross section through the wheel, and

Fig. 3 is a fragmentary sectional view showing a modified form of mounting device.

The wheel embodies a hub structure 1 of any suitable type which is provided with a flange 2 to which is secured by bolts 3 and clamping ring 4 the body of the wheel indicated at 5.

The body of the wheel may be of any preferred form, and, if made in accordance with any prior applications above referred to, may comprise a series of radial ribs 6 merging into a circumferential rib 7.

The outer periphery or boundary of the wheel is formed as a cylindrical surface parallel or approximately parallel to the axis of the wheel. This surface is indicated at 8. The side of the outer surface of the wheel remote from the front face is formed with an outwardly projecting flange 9, the edge of which is formed with a beveled flange 10 which constitutes a seat for one side of the rim 11. The under side of the rim forming the combination is constructed with two oppositely faced bevel ribs 12 and 13. The outer rib 12 is adapted to seat on the flange 10.

A series of bolts 14, of any sufficient number, are mounted in the flange 9 and extend parallel to the axis of the wheel. Over the free ends of the bolts 14 is passed a split clamping ring 15 with two converging bevel edges, the inner one of which is adapted to rest on the curved or bevel surface 20, where the body of the wheel meets its periphery 8, the outer one contacting the outer bevel rib 13. Nuts 16 are threaded on the bolts and will force the ring into its seat clamping the rim in place.

A more compact structure is shown in the modification illustrated in Fig. 3, in which the flange 9 is omitted, the beveled seat 10 being formed directly from the periphery 8. In this modification the ring 15 is replaced by a split ring 17, triangular in cross section which fits between the bevel or curved surface 20 and the rib 13 on the rim. A plurality of bolts 18 are seated in the body of the wheel inside of the surface 20, the bolts carrying each a clamp plate 19 which contacts the outer surface of the ring 17. Nuts 21 serve to force the clamp plate against the ring.

It will be seen that there is provided a neat and compact mounting for a demountable rim with a minimum number of parts. Modifications may be made, but such modifications as come within my invention are intended to be covered by this application.

I claim:

1. In a wheel construction, the combination of a metallic disk extending from the hub to the periphery, an integral cylindrical portion comprising the periphery of said disk, a sloping surface connecting said cylindrical surface and said disk, a rim seat on said cylindrical portion, a demountable rim, one side of said rim resting on said seat and a locking element adapted to enter the space between said rim and said sloping surface to hold the rim in position.

2. In a wheel construction, the combination of a metallic disk extending from the hub to the periphery of the wheel, an integral cylindrical portion comprising the periphery of said disk, a beveled surface connecting the body of the disk and the periphery, a rim seat at the side of said periphery opposite the beveled surface, a demountable rim, having two oppositely facing beveled ribs on its inner surface, one of said ribs resting on said rim seat, and a locking element adapted to enter the space between the other said rib and the beveled surface.

3. In a wheel construction, the combination of a metallic disk, forming the body of said wheel, an integral cylindrical peripheral portion on said disk, a beveled surface connecting the body of the wheel and the peripheral portion, an outwardly extending flange at the edge of said peripheral portion and a rim seat on said flange, a demountable rim, one side of said rim resting on said seat, a locking ring between the other side of said rim and said beveled surface, and a plurality of bolts extending through said flange and said ring, and means on said bolts to draw the ring into clamping position.

JOSEPH G. SWAIN.